US010215836B2

(12) United States Patent
Yoon et al.

(10) Patent No.: US 10,215,836 B2
(45) Date of Patent: Feb. 26, 2019

(54) GEOLOCATION ON A SINGLE PLATFORM HAVING FLEXIBLE PORTIONS

(71) Applicant: Raytheon Company, Waltham, MA (US)

(72) Inventors: Albert Yoon, Waltham, MA (US); Phuoc T. Ho, Waltham, MA (US); Stanley I. Tsunoda, Waltham, MA (US)

(73) Assignee: Raytheon Company, Waltham, MA (US)

( * ) Notice: Subject to any disclaimer, the term of this patent is extended or adjusted under 35 U.S.C. 154(b) by 423 days.

(21) Appl. No.: 15/062,776

(22) Filed: Mar. 7, 2016

(65) Prior Publication Data

US 2017/0254877 A1    Sep. 7, 2017

(51) Int. Cl.
*G01S 5/06* (2006.01)
*G01C 21/16* (2006.01)
*G01S 5/02* (2010.01)
*G01S 7/02* (2006.01)

(52) U.S. Cl.
CPC .............. *G01S 5/06* (2013.01); *G01C 21/165* (2013.01); *G01S 5/0263* (2013.01); *G01S 7/021* (2013.01)

(58) Field of Classification Search
CPC . G01S 5/06; G01S 3/46; G01S 5/0263; G01C 21/165
See application file for complete search history.

(56) References Cited

U.S. PATENT DOCUMENTS

| 4,642,649 A * | 2/1987 | Lightfoot ................ G01S 3/58 342/458 |
| 6,577,272 B1 * | 6/2003 | Madden ................... G01S 3/50 342/387 |
| 7,286,085 B2 * | 10/2007 | Kolanek .................. G01S 3/46 342/424 |
| 7,307,585 B2 * | 12/2007 | Hinnant, Jr. ........ G01M 5/0016 342/357.22 |
| 7,907,089 B2 * | 3/2011 | Heurguier ................ G01S 3/46 342/449 |
| 9,223,007 B2 * | 12/2015 | Wellman .............. G01C 21/165 |
| 9,746,392 B2 * | 8/2017 | Hinnant, Jr. ........ G01M 5/0016 |

(Continued)

OTHER PUBLICATIONS

International Search Report and Written Opinion from related PCT Application No. PCT/US2016/055742 dated Aug. 18, 2017.

*Primary Examiner* — Gregory C. Issing
(74) *Attorney, Agent, or Firm* — Burns & Levinson, LLP; Joseph M. Maraia

(57) ABSTRACT

A geolocation system on a platform, for example, an airplane, to identify a location of a signal emitting site includes an inertial navigation system and an array of signal detectors. A first subset of the detectors is on a flexing portion of the platform and a second subset of detectors is on a rigid portion of the platform. An inertial measurement unit is disposed adjacent to each of the detectors on the flexing portion. A locator module is configured to: calculate a respective velocity and a respective position of each one of the detectors positioned on the flexing portion as a function of respective inertial measurement data; and determine a position of the emitter as a function of the calculated velocity, calculated position, inertial navigation data, the detected signal data and data defining a flexure relationship between the flexing and rigid portions of the platform.

11 Claims, 9 Drawing Sheets

(56) References Cited

U.S. PATENT DOCUMENTS

| | | | |
|---|---|---|---|
| 9,909,872 B2* | 3/2018 | Ganguli | G01C 25/005 |
| 2005/0242991 A1* | 11/2005 | Montgomery | G01S 19/15 |
| | | | 342/357.36 |
| 2006/0114157 A1 | 6/2006 | Kolanek et al. | |
| 2006/0224321 A1* | 10/2006 | Lund | G01C 19/58 |
| | | | 701/470 |
| 2009/0030608 A1* | 1/2009 | Soehren | G01C 21/165 |
| | | | 701/510 |
| 2014/0139374 A1 | 5/2014 | Wellman et al. | |

* cited by examiner

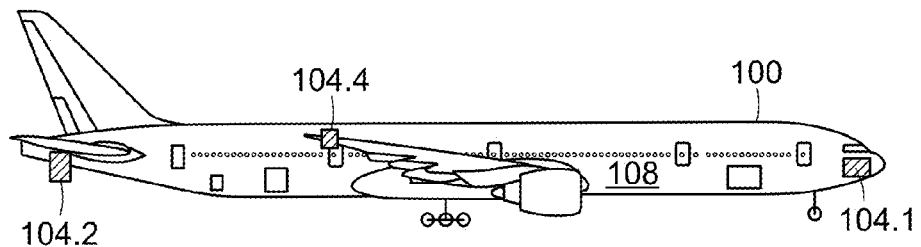
FIG. 1.1
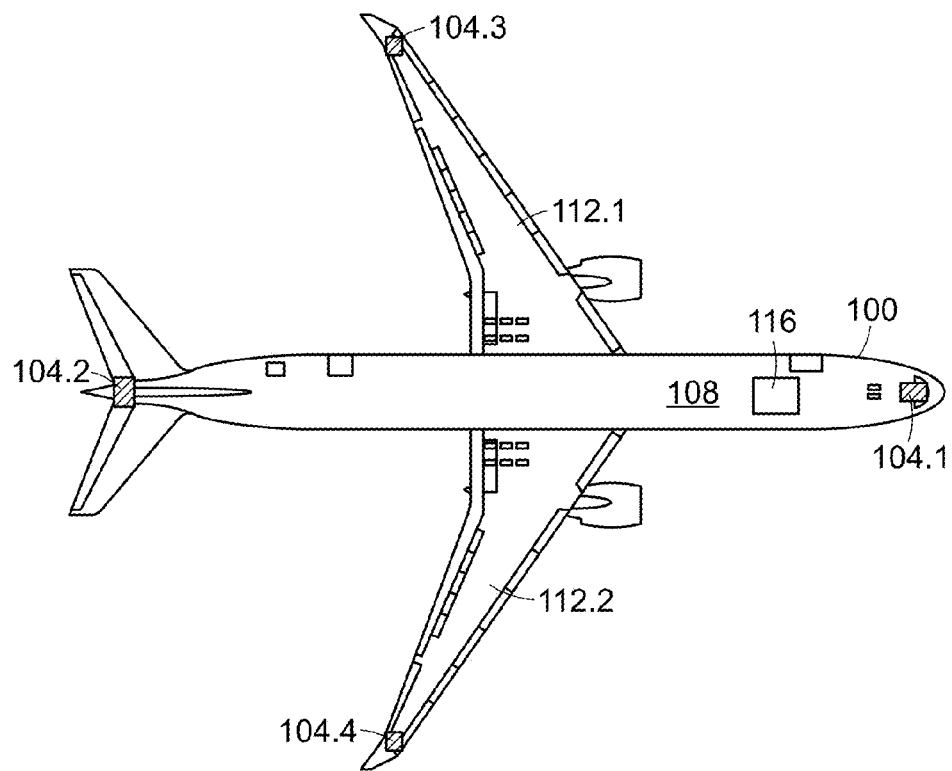
FIG. 1.2
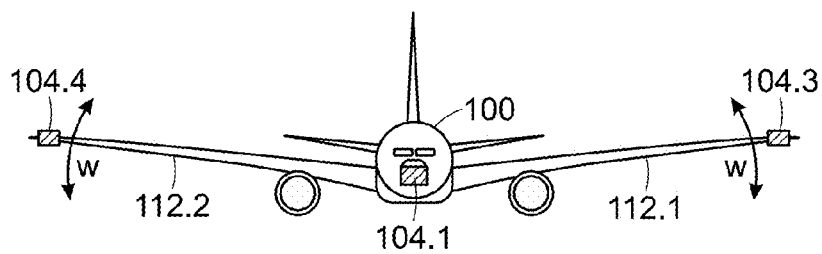
FIG. 1.3

$$\tau = -\frac{1}{c}\vec{b}\cdot\hat{r}_0 \qquad \boxed{\text{TDOA}, \tau}$$

$$c\frac{d\tau}{dt} = -\frac{d\vec{b}}{dt}\cdot\hat{r}_0 - \vec{b}\cdot\frac{d\hat{r}_0}{dt} \qquad \boxed{\text{FDOA}}$$

$$= -\frac{d\vec{b}}{dt}\bigg]_{non-rigid}\cdot\hat{r}_0 - (\vec{\omega}\times\vec{b})\cdot\hat{r}_0 - \vec{b}\cdot\frac{d\hat{r}_0}{dt}$$

GEOLOCATION ON A SINGLE PLATFORM HAVING FLEXIBLE PORTIONS

GOVERNMENT SUPPORT

The invention was supported, in whole or in part, by United States Government Contract No: FA8625-11-C-6600 and the Government funding is from the Department of Defense. The United States Government has certain rights in the invention.

BACKGROUND OF THE INVENTION

Oftentimes it is necessary for an airplane to determine the geolocation of a radio frequency (RF) emitter, for example, a radar station. As shown in FIGS. 1.1-1.3, a side-view, top-view and front-view of an airplane 100, respectively, a number of antennas, i.e., signal receivers, 104.1-104.4 are provided on the plane 100. Two of the antennas 104.1, 104.2 are provided on a fuselage 108 while the other two antennas 104.3, 104.4 are provided on a respective wing 112.1, 112.2. The antennas 104 are provided to detect a signal being transmitted from an emitter such as, for example, a radar station. In addition, an Inertial Navigation System (INS) 116, the operation of which is well known, is provided on the airplane 100 and is used, in combination with the signals detected by the antennas 104, to determine a location of the radar station with respect to the airplane 100.

It is well known, however, that the wings 112 of modern airplanes 100 can move significantly with respect to the fuselage 108 as represented by the arrows W shown in FIG. 1.3. For an airplane such as, for example, a Boeing 767, about 166 feet long with a wingspan of about 158 feet, the tips of the wings can "flex" or move around several inches, which is comparable to a typical RF wavelength of a radar station emission. As a result, the signals received at the antennas 104 on the wings 112 will introduce significant errors into the determination of location as the displacement, due to the flexing, of the wings 112 with respect to the antennas mounted on the fuselage 108.

Due to the flexure of the wings, known geolocation systems have been provided with either relaxed requirements, i.e., reduced accuracy requirements, and/or have been limited to platforms with shorter and stiffer wings in order to shorten the baselines.

Accordingly, what is needed is a way to make the determination of the location of a signal emitting station, as detected by antennas on a flexible platform, more accurate.

BRIEF SUMMARY OF THE INVENTION

In one embodiment of the present invention, a method of determining a position of a signal emitter with respect to a platform having a rigid portion and a flexing portion, implemented by one or more processors, comprises: receiving inertial navigation data corresponding to the platform; detecting a signal from the signal emitter at a plurality of signal detectors in an array of detectors positioned on the platform, wherein a first subset of the detectors are positioned on the flexing portion and a second subset of detectors are positioned on the rigid portion; calculating a respective velocity and a respective position of each one of the detectors positioned on the flexing portion; and determining the position of the emitter as a calculated function of the calculated velocity, the calculated position, the received inertial navigation data, the emitter signals received at each of the detectors in the array and data defining a flexure relationship between the flexing and rigid portions of the platform.

Determining the emitter position may include nulling flexure motion measurements from the calculations as a function of the flexure relationship data.

In addition, the flexure motion measurement may be nulled by a filtering operation of a filter having notches set to vibrational modes defined in the flexure relationship data.

In one embodiment, the platform is an aircraft, wherein the rigid portion comprises the fuselage and the flexing portion comprises a wing attached to the fuselage, and wherein the flexure relationship data is defined by a manufacturer of the aircraft.

A geolocation system, in accordance with an embodiment of the present invention includes: an inertial navigation system (INS) disposed on a platform and configured to provide inertial navigation data with respect to the platform; an array of signal detectors disposed on the platform, wherein a first subset of the signal detectors is disposed on a flexing portion of the platform and a second subset of signal detectors is disposed on a rigid portion of the platform, each signal detector configured to provide detected signal data for a signal received from a signal emitter, a respective inertial measurement unit (IMU) disposed adjacent to each of the one or more signal detectors on the flexing portion, each IMU configured to provide respective inertial measurement data for the adjacent signal detector, and a locator module, implemented by one or more processors, coupled to the INS, IMUs and the signal detectors. The locator module is configured to: calculate a respective velocity and a respective position of each one of the detectors on the flexing portion as a function of the respective inertial measurement data; and determine a position of the emitter as a function of the calculated velocity, calculated position, the inertial navigation data, the detected signal data and data defining a flexure relationship between the flexing and rigid portions of the platform.

BRIEF DESCRIPTION OF THE DRAWINGS

Various aspects of at least one embodiment of the present invention are discussed below with reference to the accompanying figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, not every component may be labeled in every drawing. The figures are provided for the purposes of illustration and explanation and are not intended as a definition of the limits of the invention. In the figures:

FIGS. 1.1-1.3 and 2 are representations of a conventional platform for determining geolocation as known in the art;

FIG. 9 presents time difference of arrival (TDOA) and frequency difference of arrival (FDOA) estimation formulas.

DETAILED DESCRIPTION

Figure 2:
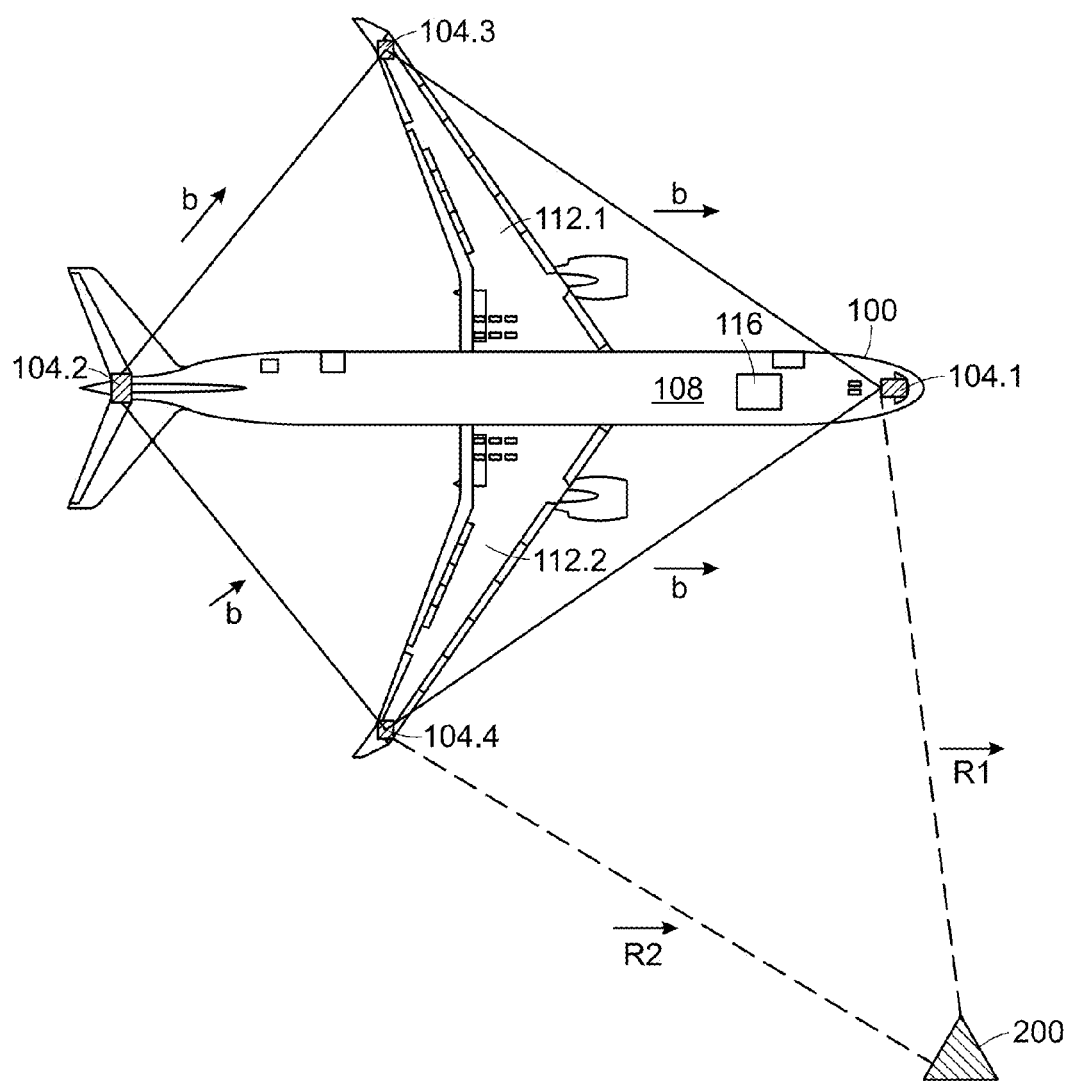

In the following detailed description, numerous specific details are set forth in order to provide a thorough understanding of the embodiments of the present invention. It will be understood by those of ordinary skill in the art that these embodiments of the present invention may be practiced without some of these specific details. In other instances, well-known methods, procedures, components and structures may not have been described in detail so as not to obscure the embodiments of the present invention.

Prior to explaining at least one embodiment of the present invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description only and should not be regarded as limiting.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Referring now to FIG. 2, as is known, the signals received from a signal emitting location, for example, a radar station 200, are detected by the antennas 104. In one approach, known time difference of arrival (TDOA) and frequency difference of arrival (FDOA) measurements and estimations are applied. In this approach, the time difference of arrival, t, of a pulsed RF signal along virtual signal lines R2 and R1 is continually measured over a short period of time. During this time, the time rate of change of r is also determined which produces the FDOA. The estimates of TDOA and FDOA, however, require position and velocities of the baseline vectors $\vec{b}$ where the baseline vectors $\vec{b}$ are the displacements between each of the antennas 104 as shown. In operation, the inertial navigation information is used to determine the baseline vector $\vec{b}$ and its time derivative to determine location according to the formulas presented in FIG. 9.

When, however, a baseline vector $\vec{b}$ is flexible, i.e., its length and direction change while signals are being detected, in this case due to the movement of the wings 112 during flight, then using the inertial navigation information alone may not allow the baseline vector $\vec{b}$ and its time derivative to be accurately calculated, thus leading to an incorrect location determination.

Figure 3:
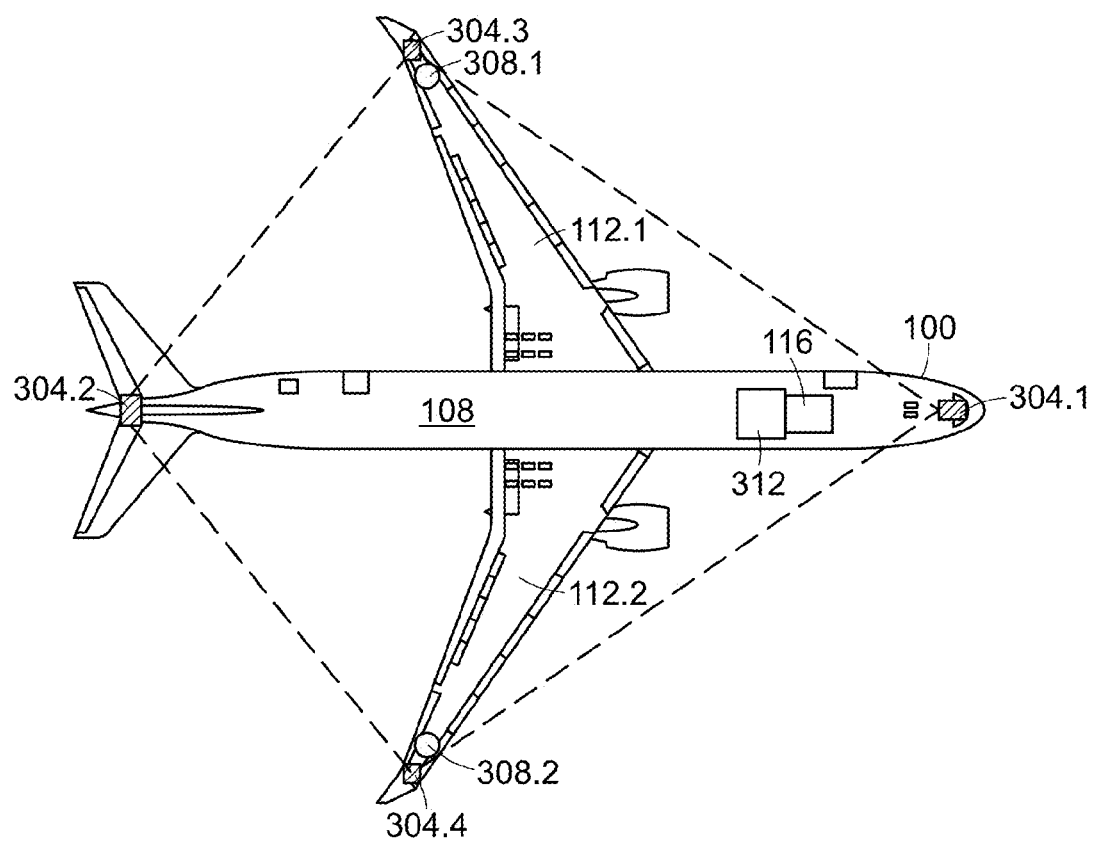
FIG. 3 is a platform in accordance with an embodiment of the present invention.

Referring now to FIG. 3, in one embodiment of the present invention, with a single platform being exemplified by the airplane 100, a set of antenna assemblies 304.1-304.4 are provided on the plane 100. Two of the antenna assemblies, a fore antenna assembly 304.1 and an aft antenna assembly 304.2, are provided on the fuselage 108 while the other two antenna assemblies, a port antenna assembly 304.3 and a starboard antenna assembly 304.4, are provided on a respective wing 112.1, 112.2. The antenna assemblies 304 are provided to detect a signal being transmitted from an emitter such as, for example, the radar station 200 of FIG. 2, and to provide information or data regarding the detected signal. It should be noted that the reference to an "antenna assembly" includes the antenna structure itself in addition to any processing components necessary to carry out its detecting or receiving functions as known to one of ordinary skill in the art. These processing components are not shown nor described in any detail herein as they are not germane to the understanding of the present invention and are already understood by those of ordinary skill in the art. Any reference herein to "antenna," "antennas," "receiver," "receivers," "detector" or "detectors" is referring to the "antenna assembly" and its signal detecting or signal receiving functions.

As should be understood, the fore and aft antenna assemblies 304.1, 304.2 are on a relatively rigid structure, i.e., the fuselage, and, therefore, the distance between them does not change. The baselines from these structures to the antenna assemblies 304.3, 304.4 on the wings, however, will be variable, especially during flight, due to the wing movement.

In one embodiment of the present invention, respective port and starboard Inertial Measurement Units (IMUs) 308.1, 308.2, respectively, are installed next to the wingtip antenna assemblies 304.3, 304.4 to sense and navigate the motion of the wings 112 and, therefore, the motion of the port and starboard antenna assemblies 304.3, 304.4. The information from the IMUs 308 is processed by a locator module 312 and is used to determine the position and velocity induced by the flexure of the wings 112, that would otherwise prevent accurate measurements of the baseline motion as described above, from being computed accurately.

Figure 4:
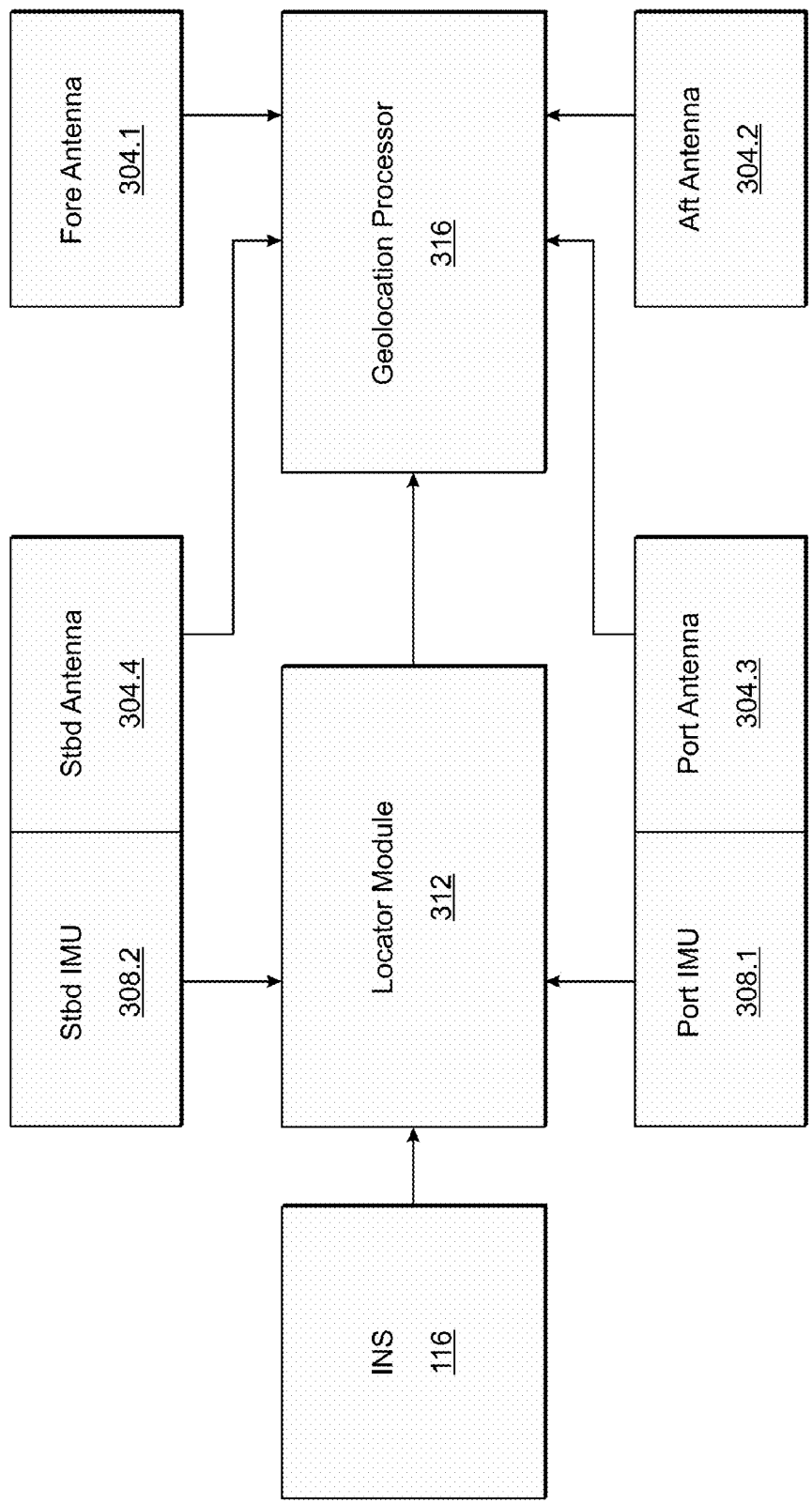
FIG. 4 is a functional block diagram of an embodiment of the present invention.

Referring now to FIG. 4, the locator module 312 receives input from the INS 116 and the port and starboard IMUs 308.1, 308.2 and provides an output to a geolocation processor 316. The geolocation processor 316 takes motion data from the locator module 312 together with RF signal data from the antennas 304.1, 304.2, 304.3, 304.4 and forms the geolocation solution. The geolocation processor 316 uses the relative positions and velocities of the antennas 304 as well as measurements of TDOA and FDOA to estimate the geolocation solution. The locator module 312 includes one or more appropriately programmed processors and peripheral devices necessary to perform the functions as described below.

Figure 5:
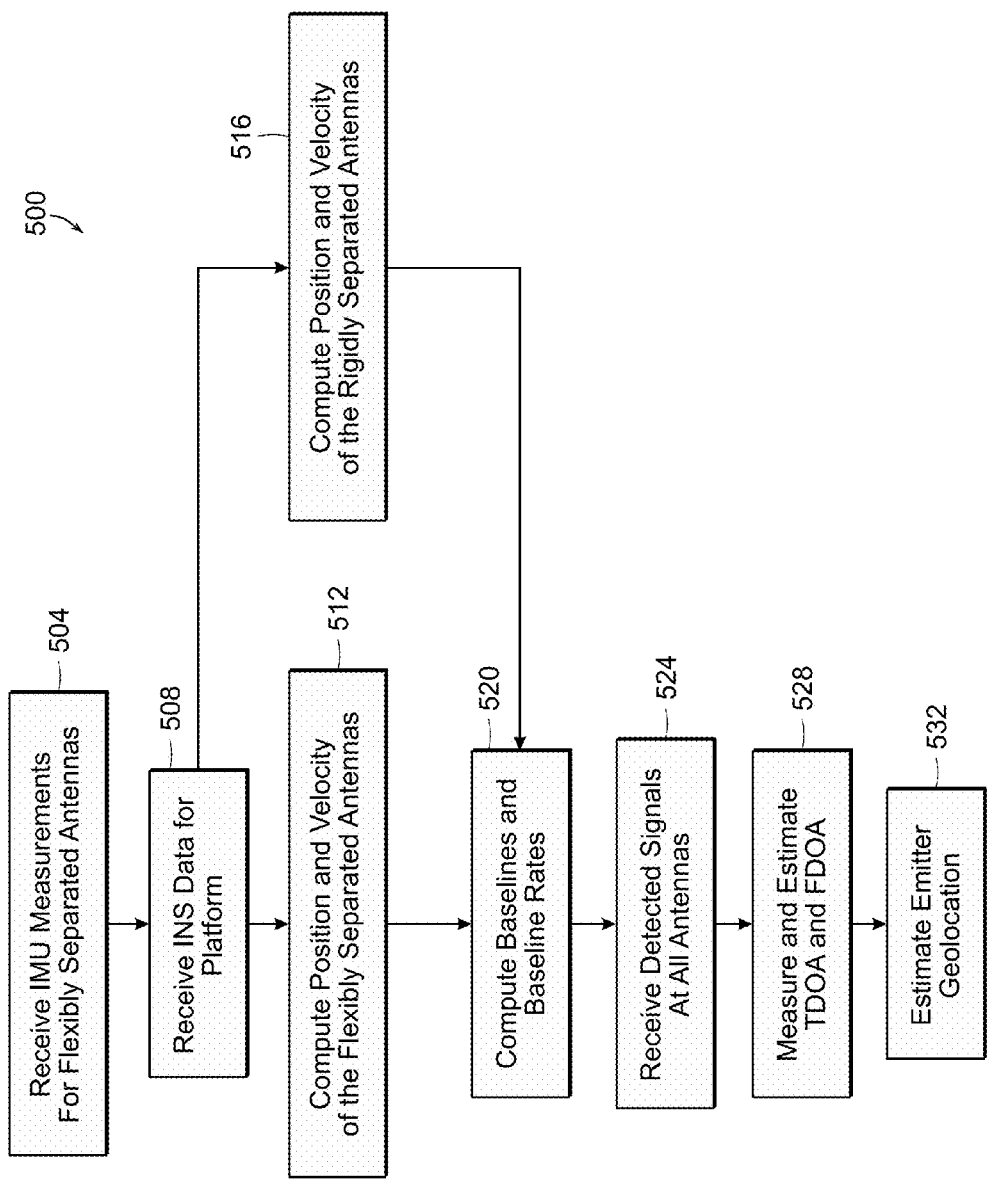
FIG. 5 is a flowchart of a method in accordance with an embodiment of the present invention.

In one embodiment of the present invention, referring to FIG. 5, a method 500 includes, at step 504, receiving IMU data for the two "flexing" or "moving" antennas 304.3, 304.4. Subsequently, at step 508, INS data for the platform, i.e., the airplane 100, is received. The positions and velocities of the two flexing antennas on the wings, 304.3, 304.4, are computed using the IMU data and the INS data, at step 512, while the position and velocity of the rigidly separated antennas 304.1, 304.2 is also computed, at step 516. The baseline and baseline rates are computed, at step 520, using the results of the computations of steps 512 and 516. At step 524, signals detected at all antennas are received and the TDOA and FDOA are measured and estimated, at step 528. Ultimately, the emitter geolocation is estimated, at step 532.

Figure 6:
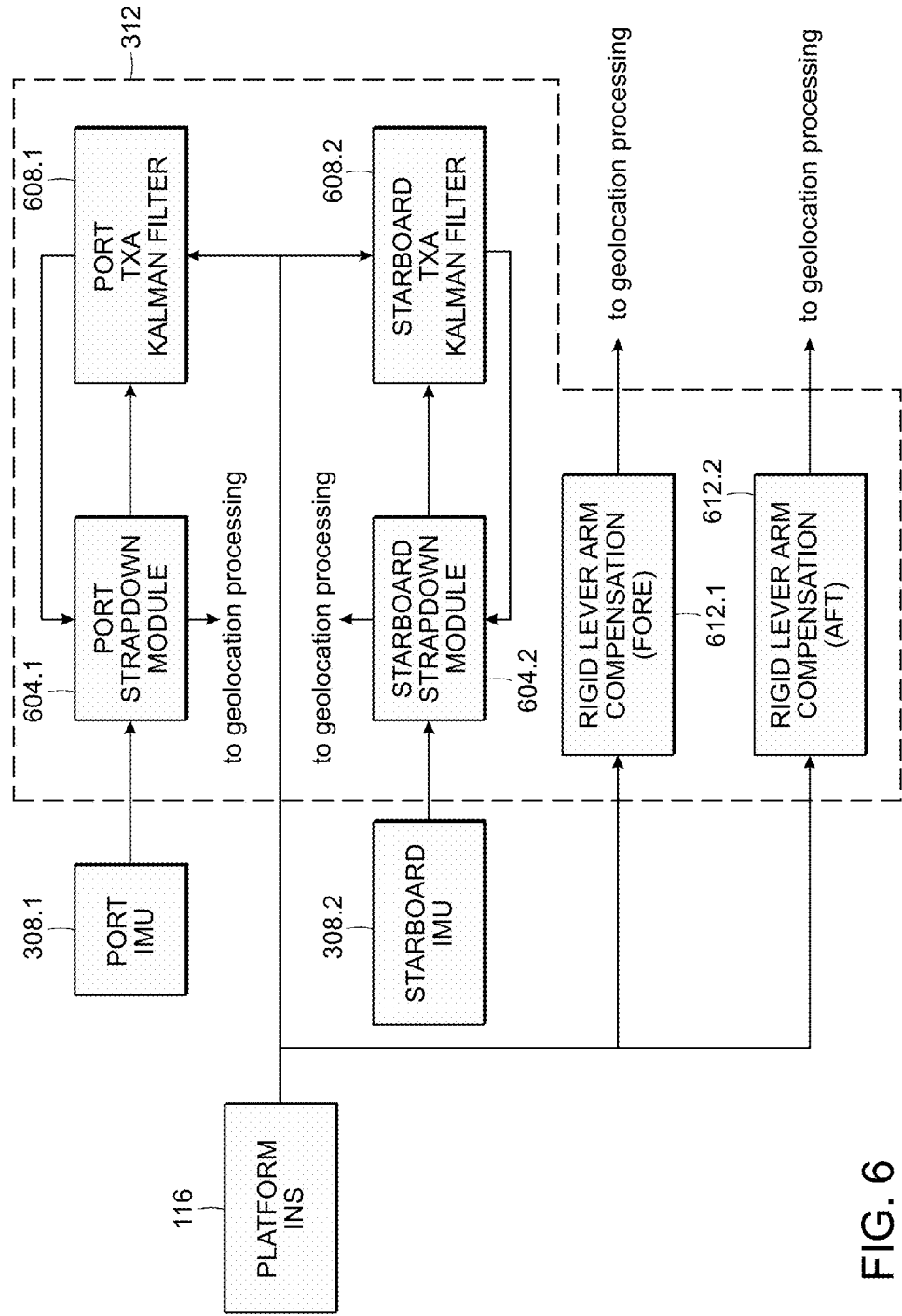
FIG. 6 is a functional block diagram of an embodiment of the present invention.

More specifically, as shown in the functional block diagram of FIG. 6, the locator module 312 includes a Port Strapdown Module 604.1 that receives the output from the port IMU 308.1 and, iteratively, in conjunction with a Port Transfer/Alignment (TXA) Kalman Filter 608.1, provides information to the geolocation processor 316 (not shown in FIG. 6). Similarly, a Starboard Strapdown Module 604.2 that receives the output from the Starboard IMU 308.2 and, iteratively, in conjunction with a Starboard TXA Kalman Filter 608.2, provides information to the geolocation processor 316 is included. Each of the Port and Starboard TXA Kalman Filters 608.1, 608.2 also receives output from the platform INS 116. The locator module 312 also includes a Rigid Lever Arm Compensation (Fore) module 612.1 and a Rigid Lever Arm Compensation (Aft) module 612.2, each of which receives data from the platform INS 116 and provides respective outputs to the geolocation processor 316.

Each of the strapdown modules 604 implements a suite of navigation algorithms, well known to those of ordinary skill in the art of inertial navigation, that integrate the IMU measurements to compute position, velocity and attitude. The TXA Kalman filters 608 implement functions that compare the respective IMU 308 and INS 116 navigation solutions and generate corrections back to the respective strapdown module 604. In addition, each of the TXA Kalman filters 608 also implements a notch filter function that "nulls" the flexure motion measurement in the Kalman filter measurement updating function. The filter notches are set to the vibrational modes, using the manufacturer-provided information about the wing structure flexing. This process separates out the flexure motion from the computed residual that is used by the Kalman filter to generate a correction. Without this, the true flexure motion that the IMU is intended to sense is interpreted by the Kalman filter as error and would cause the Kalman filter to attempt to remove the flexure motion from the navigation solution.

Advantageously, embodiments of the present invention implement a process of computing a residual that can then be used to generate a correction to the IMU-based navigation solution. The residual determination is added to the Extended Kalman Filter processing.

Figure 7:
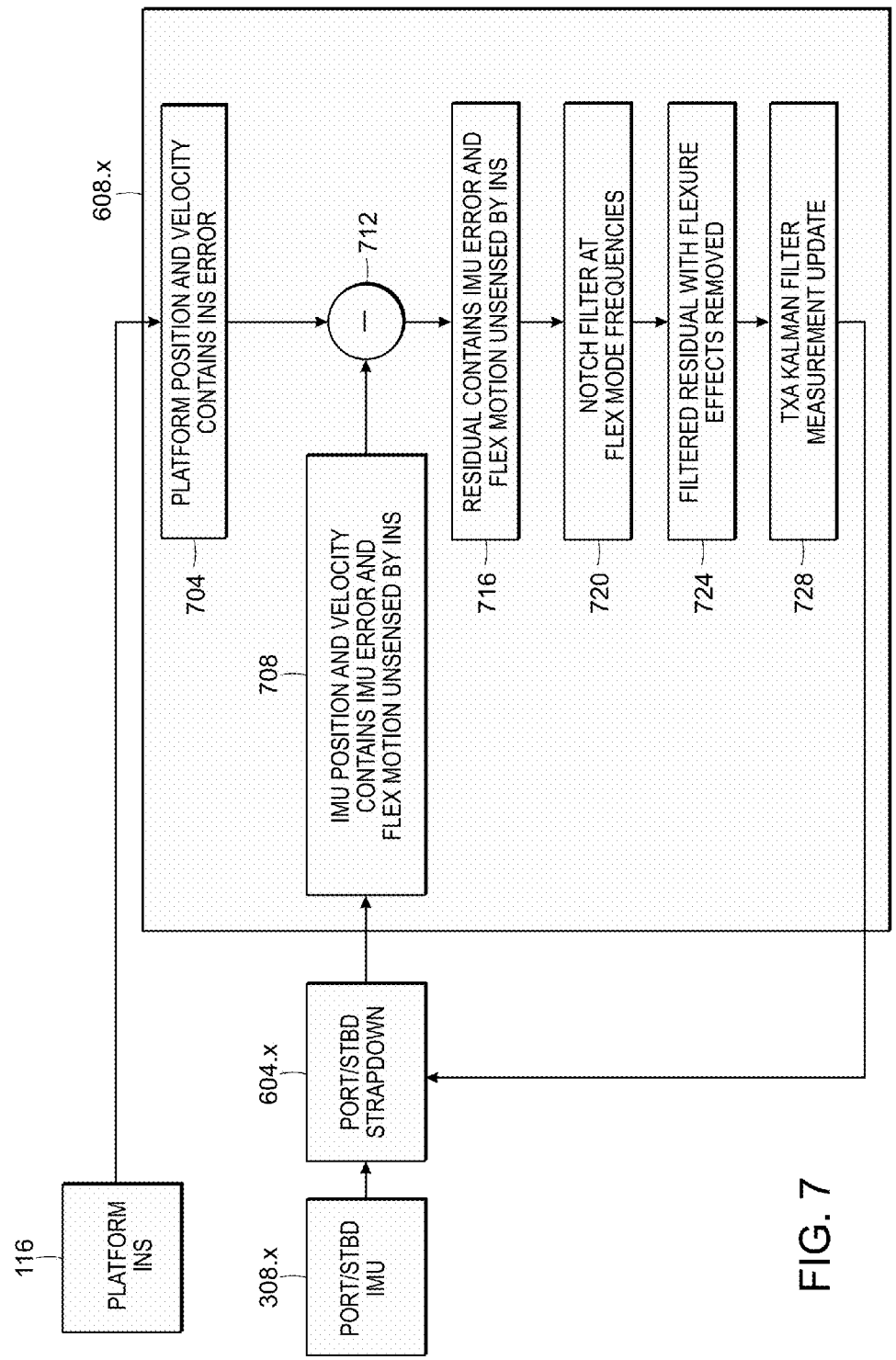
FIG. 7 is a functional block diagram of an embodiment of the present invention.

Referring now to FIG. 7, within each Kalman filter 608, the platform position and velocity 704 determined by the platform INS 116 includes the INS error. The IMU position and velocity 708 received from the respective strapdown module 604 contains the IMU error and the flex motion that was not sensed by the INS 116. A difference 712 between the INS navigation solution and the IMU-based navigation solution, called the residual 716, is composed of INS errors, IMU error and the non-common motion between the two that results from flexure. As above, if not properly accounted for, the flexure motion can cause the residual to be very large and have negative effects on the TXA Kalman filter performance. The notch filter 720 functions at flex mode frequencies, within the Kalman filter design and significantly decreases the flexure contribution to the residual and, advantageously, increases the accuracy of the system. The "nulling" out of the flexure motion measurement component of the residual allows the Kalman filter to be tuned for better performance and results in filtered residual information with flexure effects removed 724. As a result, an update to the TXA Kalman filter measurement 728 to be iteratively used by the strapdown modules 604 is more accurate. Nulling frequencies include, for example, but not limited to, the vibrational modes of the wing, using the manufacturer-provided information about the wing structure.

Figure 8:
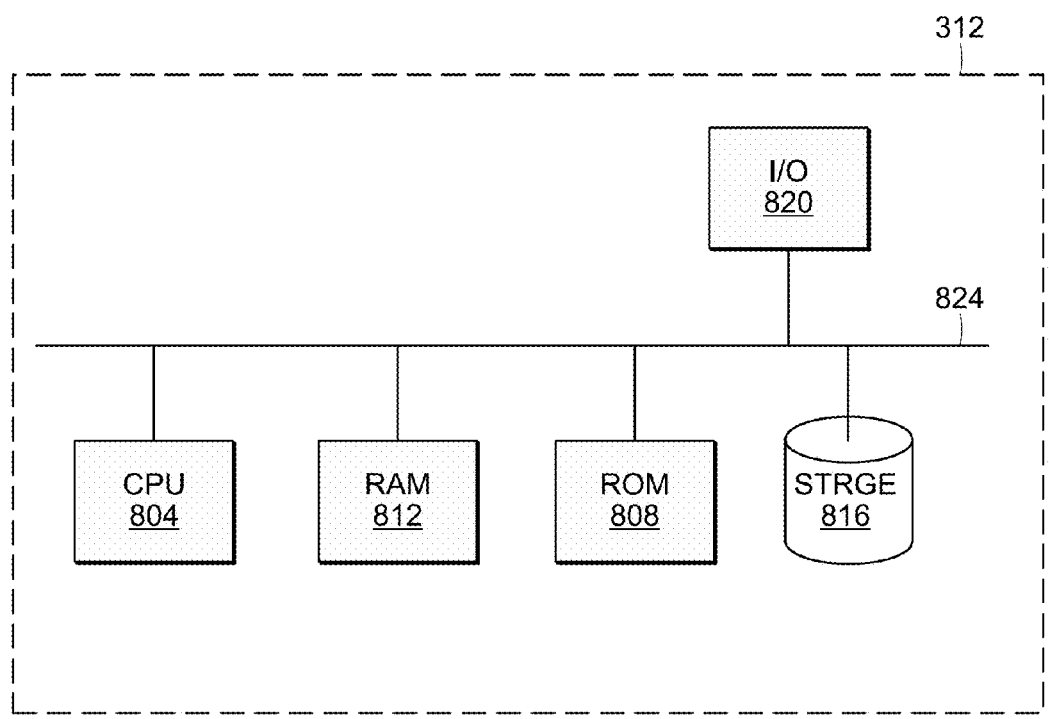
FIG. 8 is a functional block diagram of an embodiment of the present invention.

As shown in FIG. 8, in one embodiment of the present invention, the locator module 312 includes, in one non-limiting embodiment, a microprocessor or Central Processing Unit (CPU) 804, a Read Only Memory (ROM) device 808, a Random Access Memory (RAM) device 812, a storage device 816, an I/O device 820 and a bus 824. As shown, these devices communicate with one another using the bus 824. A protocol used for communicating among the devices and across the bus 824 can be any one of a number of known protocols. Further, while only one bus is shown, one of ordinary skill in the art will understand that multiple busses could be implemented where only certain devices are on a respective bus in communication with one another and some devices may not be on the same bus as others. Further, and not shown here, but which would be understood by one of ordinary skill in the art, are the ancillary devices necessary for the proper operation of the devices such as, for example, a power supply or a wired or wireless network connection.

Embodiments of the present invention provide increased accuracy in determining the location of an entity that is transmitting a signal by compensating for the flexing, or movement, of the detectors that are placed on the wings. Advantageously, what previously may have been considered to be an error, that is, the movement of the detectors on the wings, is now a benefit because the motion of the detectors provides an amount of additional observability to the geolocation system without affecting accuracy.

Still further, embodiments of the present invention provide for a geolocation system where all antennas are on a single platform, for example, the airplane 100 in the foregoing description, where at least one of the lever arms between the aircraft INS and the antenna is flexible, i.e., the wings. The present solution allows for positioning antennas on many different platforms as the IMUs can be used to provide the position and velocity information needed to compensate for flexure.

Various embodiments of the above-described systems and methods may be implemented in digital electronic circuitry, in computer hardware, firmware, and/or software. The implementation can be as a computer program product, i.e., a computer program tangibly embodied in an information carrier. The implementation can, for example, be in a machine-readable storage device and/or in a propagated signal, for execution by, or to control the operation of, data processing apparatus. The implementation can, for example, be a programmable processor, a computer and/or multiple computers.

While the above-described embodiments generally depict a computer implemented system employing at least one processor executing program steps out of at least one memory to obtain the functions herein described, it should be recognized that the presently described methods may be implemented via the use of software, firmware or alternatively, implemented as a dedicated hardware solution such as in a field programmable gate array (FPGA) or an application specific integrated circuit (ASIC) or via any other custom hardware implementation.

It is to be understood that the present invention has been described using non-limiting detailed descriptions of embodiments thereof that are provided by way of example only and are not intended to limit the scope of the invention. Features and/or steps described with respect to one embodiment may be used with other embodiments and not all embodiments of the invention have all of the features and/or steps shown in a particular figure or described with respect to one of the embodiments. Variations of embodiments described will occur to persons of skill in the art.

For example, while the antenna assemblies 304.3, 304.4 and the IMUs 308.1, 308.2 are described as separate devices, it is contemplated that a single combination device, having both functions incorporated therein, could be implemented.

It should be noted that some of the above described embodiments include structure, acts or details of structures and acts that may not be essential to the invention and which are described as examples. Structure and/or acts described herein are replaceable by equivalents that perform the same function, even if the structure or acts are different, as known in the art, e.g., the use of multiple dedicated devices to carry out at least some of the functions described as being carried out by the processor of the present invention. Therefore, the scope of the invention is limited only by the elements and limitations as used in the claims.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method of determining a position of a signal emitter with respect to a platform having a rigid portion and a flexing portion, implemented by one or more processors, comprising:
   detecting a signal from the signal emitter at a plurality of signal detectors in an array of detectors positioned on the platform, wherein a first subset of the detectors are positioned on the flexing portion and a second subset of detectors are positioned on the rigid portion;
   positioning a respective inertial measurement unit (IMU) adjacent to each of the detectors positioned on the flexing portion;
   receiving inertial navigation data corresponding to the platform;
   receiving inertial measurement data from each respective IMU;
   calculating, as a function of the received inertial measurement data, a respective velocity and a respective position of each of the detectors positioned on the flexing portion; and
   determining the position of the emitter as a calculated function of (i) the calculated velocity of each of the first subset of detectors, (ii) the calculated position of each of the first subset of detectors, (iii) the received inertial navigation data, and (iv) the emitter signals received at each of the detectors in the array,
   wherein determining the position of the emitter further comprises nulling flexure motion measurements from the calculation using a filtering operation of a filter having notches set to vibrational modes of the flexing portion,
   whereby the flexure motion measurements are separated from a computed residual used in the filtering operation to generate a correction value.

2. The method of claim 1, wherein:
   the platform is an aircraft,
   wherein the rigid portion comprises the fuselage and the flexing portion comprises a wing attached to the fuselage, and
   wherein the flexure relationship data is defined by a manufacturer of the aircraft.

3. The method of claim 1, wherein the platform is an aircraft, the method further comprising:
   positioning the rigid portion detectors on a fuselage of the aircraft; and
   positioning the flexing portion detectors on a respective wing of the aircraft.

4. The method of claim 1, further comprising:
   computing a respective position and velocity for each of the one or more flexing portion detectors; and
   determining the position of the emitter further comprises incorporating the computed respective position and velocity for each of the one or more flexing portion detectors.

5. A method of determining a position of an emitter with respect to a platform, implemented by one or more processors, comprising:
   detecting a signal from the emitter at each of a plurality of detectors provided on the platform, wherein one or more of the detectors is located on a rigid portion of the platform and one or more of the detectors is located on a respective flexing portion of the platform;
   positioning a respective inertial measurement unit (IMU) adjacent to each of the one or more flexing portion detectors;
   receiving respective inertial measurement data from the IMU for each of the one or more detectors on the flexing portion;
   receiving inertial navigation data for the platform;
   computing a respective position and velocity for each of the one or more flexing portion detectors as a function of inertial measurement data received from the respective IMU positioned adjacent each of the one or more flexing portion detectors; and
   determining the position of the emitter as a calculated function of (i) the emitter signals received at each of the detectors, (ii) the inertial measurement data, (iii) the inertial navigation data, and (iv) the computed respective position and velocity for each of the one or more flexing portion detectors,
   wherein determining the position of the emitter further comprises nulling flexure motion measurements from the calculations using a filtering operation of a filter having notches set to vibrational modes of the flexing portion,
   whereby the flexure motion measurements are separated from a computed residual used in the filtering operation to generate a correction value.

6. The method of claim 5, wherein:
   the platform is an aircraft,
   wherein the rigid portion comprises the fuselage and the flexing portion comprises a wing attached to the fuselage, and
   wherein the flexure relationship data is defined by a manufacturer of the aircraft.

7. The method of claim 5, wherein the platform is an aircraft, the method further comprising:
   positioning the one or more rigid portion detectors on a fuselage of the aircraft; and
   positioning the one or more flexing portion detectors on a respective wing of the aircraft.

8. A geolocation system, comprising:
an inertial navigation system (INS) disposed on a platform and configured to provide inertial navigation data with respect to the platform;
an array of signal detectors disposed on the platform, wherein a first subset of the signal detectors is disposed on a flexing portion of the platform and a second subset of signal detectors is disposed on a rigid portion of the platform, each signal detector configured to provide detected signal data for a signal received from a signal emitter;
a respective inertial measurement unit (IMU) disposed adjacent to each of the one or more signal detectors on the flexing portion, each IMU configured to provide respective inertial measurement data for the adjacent signal detector; and
a locator module, implemented by one or more processors, coupled to the INS, IMUs and the signal detectors, configured to:
  calculate a respective velocity and a respective position of each of the detectors on the flexing portion as a function of the respective inertial measurement data; and
  determine a position of the emitter as a function of (i) the calculated velocity of each of the first subset of detectors, (ii) the calculated position of each of the first subset of detectors, (iii) the inertial navigation data, and (iv) the detected signal data,
wherein determining the position of the emitter further comprises nulling flexure motion measurements from the calculations using a filtering operation of a filter having notches set to vibrational modes of the flexing portion,
whereby the flexure motion measurements are separated from a computed residual used in the filtering operation to generate a correction value.

9. The system of claim 8, wherein:
the platform is an aircraft,
wherein the rigid portion comprises the fuselage and the flexing portion comprises a wing attached to the fuselage, and
wherein the flexure relationship data is defined by a manufacturer of the aircraft.

10. The system of claim 8, wherein the platform is an aircraft, and wherein:
the rigid portion detectors are positioned on a fuselage of the aircraft;
the flexing portion detectors are positioned on a respective wing of the aircraft; and
each respective IMU is positioned adjacent to each of the flexing portion detectors.

11. The system of claim 8, wherein the locator module is further configured to:
determine the position of the emitter by:
  applying modified TDOA and modified FDOA functions to the signals received at each of the plurality of detectors,
  wherein the TDOA/FDOA functions are modified using the flexure relationship data and the IMU data.

\* \* \* \* \*